(12) United States Patent
Golding

(10) Patent No.: US 7,290,087 B2
(45) Date of Patent: Oct. 30, 2007

(54) ADAPTIVE GROUPING IN OBJECT RAID

(75) Inventor: Richard A. Golding, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 10/723,480

(22) Filed: Nov. 26, 2003

(65) Prior Publication Data

US 2005/0114596 A1    May 26, 2005

(51) Int. Cl.
*G06F 12/00* (2006.01)
(52) U.S. Cl. .............................. 711/114; 710/20; 714/6
(58) Field of Classification Search ................. 711/114
See application file for complete search history.

(56) References Cited

U.S. PATENT DOCUMENTS

| | | |
|---|---|---|
| 5,392,244 A | 2/1995 | Jacobson et al. |
| 5,659,704 A | 8/1997 | Burkes et al. |
| 5,664,187 A | 9/1997 | Burkes et al. |
| 5,893,919 A | 4/1999 | Sarkozy et al. |
| 5,960,169 A | 9/1999 | Styczinski |
| 5,960,451 A | 9/1999 | Voigt et al. |
| 6,154,854 A | 11/2000 | Stallmo |
| 6,275,898 B1 * | 8/2001 | DeKoning .................. 711/114 |
| 6,378,038 B1 | 4/2002 | Richardson et al. |
| 6,513,093 B1 | 1/2003 | Chen et al. |
| 6,571,314 B1 * | 5/2003 | Komachiya et al. ........ 711/114 |
| 2002/0087544 A1 | 7/2002 | Selkirk et al. |
| 2002/0087787 A1 | 7/2002 | Selkirk et al. |
| 2002/0112118 A1 * | 8/2002 | Komachiya et al. ........ 711/114 |
| 2003/0188097 A1 * | 10/2003 | Holland et al. ............. 711/114 |
| 2004/0133743 A1 * | 7/2004 | Ito et al. ..................... 711/114 |
| 2004/0172503 A1 * | 9/2004 | Merchant .................... 711/114 |

\* cited by examiner

*Primary Examiner*—Brian R. Peugh
*Assistant Examiner*—Matthew Bradley
(74) *Attorney, Agent, or Firm*—Gibb & Rahman, LLC

(57) ABSTRACT

A method and system for data redundancy, wherein method comprises storing an object in an object storage device, storing a duplicate of the object in a second object storage device, converting the object into any of a grouped object Redundant Array of Independent Disks (RAID) layout and an individual RAID layout upon growth of the object, and discarding the duplicate object. The step of converting further comprises determining which of the grouped object RAID or individual RAID layout to convert the object into based on a size of the object being converted. Moreover, the step of converting into a grouped object RAID layout further comprises selecting a group based on whether the group comprises other objects similarly sized to the object, wherein the similarly sized objects comprise variably sized objects.

28 Claims, 4 Drawing Sheets

ADAPTIVE GROUPING IN OBJECT RAID

BACKGROUND OF THE INVENTION

1. Field of the Invention

The invention generally relates to non-volatile memory systems, and more particularly to computer disk arrays and object storage devices allowing space efficiency through data migration and data storage redundancy management.

2. Description of the Related Art

Mass storage systems generally organize their data either as block storage or object storage. Block storage systems store data as a fixed sequence of blocks, each block consisting of some fixed number of bytes of data. Each block can be addressed by its number in the sequence of blocks. Object storage systems store data as a variable number of objects, each object consisting of a variable number of bytes of data. Each object is addressed by an arbitrary object identifier.

The three primary design criteria for mass storage computer systems are cost, performance, and availability. It is most desirable to produce memory devices that have a low cost per megabit, a high input/output performance, and high data availability. "Data availability" is the ability to recover data stored in the storage system even though some of the data has become inaccessible due to failure or some other reason (i.e., deletion of data) and the ability to ensure continued operation in the event of such a failure. Usually, data availability is provided through use of redundancy management wherein data, or relationships among data, are stored in multiple locations. Specifically, data redundancy involves duplicating data into multiple storage devices.

Redundant storage systems consist of two or more storage devices such as disk drives and one or more controllers that manage the redundant data. Redundant block stores provide a virtual reliable disk using block disks. Redundant object stores provide a set of redundant "virtual objects." Each redundant virtual object is stored using one object on each of two or more object storage devices.

Traditionally, there have been two common methods of storing redundant data. According to the first method or "mirror" method, data is duplicated and stored in two or more separate areas of the storage system. For example, in a disk array, the identical data is provided on two separate disks in the disk array. This method is also referred to as "RAID level 1", for Redundant Array of Independent Disks. The mirror method has the advantages of high performance and high data reliability due to the duplex storing technique. However, the mirror method is also relatively expensive as the overhead effectively doubles the cost of storing the data. In other words, the overhead of mirrored storage is 50% when the system has two identical copies of the data, or more generally, $1/n$ when the system stores n copies.

In the second method or "parity" method, a portion of the storage area is used to store redundant data, but the size of the redundant storage area is less than the remaining storage space used to store the original data. For example, in a disk array having five disks, four disks might be used to store data with the fifth disk being dedicated to storing redundant data. This method of redundancy management includes RAID levels 2, 3, 4, 5, 53, and others. The parity method is advantageous because it is less costly than the mirror method. The overhead of the parity method is $1/(n+1)$ when the system stripes data over n storage devices, which translates into a lower cost system than the mirror method. However, the parity method has lower performance and availability characteristics in comparison to the mirror method. Related methods, such as RAID level 6, improve the availability by storing additional redundant data so that the system can withstand the failure of up to two disk drives. The extra copies result in greater overhead and greater cost than schemes that store only one redundant data copy.

Redundant object storage systems use variations on both the mirror and parity methods. In the mirror method for object storage, the system stores a virtual object by creating one physical object on each of two or more object storage devices, and storing identical copies of the virtual object data in each physical object. In the parity method for object storage, the system stores a virtual object by striping the virtual object's data across physical objects on multiple object storage devices, and storing a redundant copy of each stripe's data in one physical object on a different object storage device. For large virtual objects, the parity method is less costly than the mirror method. For small virtual objects, however, there may not be enough data to stripe across multiple physical objects efficiently, and so the cost of the parity method is no better than the cost of the mirror method.

Redundant object storage systems can also use a third storage method, the "grouped RAID" method, as shown in FIG. 1. In this method, one or more virtual objects are grouped together. Each virtual object is stored in one physical object, each on a different object storage device. In addition, a parity physical object stores redundant data for all the objects in the group. The parity object is stored on an object storage device separate from the object storage devices used for the other physical objects in the group. This method yields lower cost than the parity or mirror method when many small virtual objects can be combined into one group. Note that this is the subject of another patent application in progress.

In a grouped object RAID, the overhead depends on how much the sizes of the objects in the group differ. When all the virtual objects in the group are the same size, the overhead is $1/(n+1)$ for a group of n objects. However, when the virtual object lengths differ greatly, the storage overhead increases and can approach the 50% overhead of mirroring. FIG. 1 illustrates one-block objects (A and B) and one long object (C) grouped together. As shown, two of the objects (A and B) have a single block allocated, while the other object (C) is ten blocks long (C1 . . . C10). The parity object must be as long as the longest object (C), thus the parity object is also 10 blocks long (P1 . . . P10). The system thus stores 10 blocks in the parity object for 12 blocks of virtual object data. The overhead is therefore 10/(10+12) or just below 50%, which is slightly better than the mirror method.

However, because the overhead using the grouped object RAID method can vary widely, there remains a need for a data migration method that will ensure low overhead even as virtual objects change size.

SUMMARY OF THE INVENTION

In view of the foregoing, an embodiment of the invention provides a method of performing data redundancy, the method comprising storing an object in an object storage device, storing a duplicate of the object in a second object storage device, converting the object into any of a grouped object Redundant Array of Independent Disks (RAID) layout and an individual RAID layout as the object changes in size (upon growth of the object), and discarding the duplicate object. The step of converting further comprises determining which of the grouped object RAID or individual RAID layout to convert the object into based on a size of the object being converted. Moreover, the step of converting into a grouped object RAID layout further comprises selecting a group based on whether the group comprises other objects similarly sized to the object, wherein the similarly sized objects comprise variably sized objects.

The method further comprises recomputing a parity of the group to include the object. Also, the RAID layout comprises any of a RAID 5, a RAID 6, and a striped RAID layout. Furthermore, the step of converting occurs when a predetermined number objects have been duplicated. Additionally, the step of converting occurs when the storage devices reach a limit on storage space. Moreover, according to the invention the step of converting occurs when the object remains dormant for a predetermined period of time. Also, the step of converting to a grouped object RAID layout further comprises forming a group of similarly sized objects in the grouped object RAID layout, wherein the similarly sized objects comprise variably sized objects. The method further comprises removing the converted object from the grouped object RAID and duplicating the converted object.

In another embodiment, the invention provides a method of data redundancy, wherein the method comprises storing a variably sized object in a first object storage system, mirroring the object, temporarily storing the mirrored object in a second object storage system, converting the object into any of a grouped object Redundant Array of Independent Disks (RAID) layout and an individual RAID layout upon growth of the object, and discarding the mirrored object.

Additionally, according to another embodiment, the invention provides a system for performing data redundancy comprising a set of object storage devices, a variably sized object in a first object storage device, a redundancy data management controller operable for duplicating the object, a second object storage device operable for temporarily storing the duplicated object; a data converter operable for converting the object into any of a grouped object Redundant Array of Independent Disks (RAID) layout and an individual RAID layout upon growth of the object; and a data purger operable for discarding the mirrored object.

According to the system the data converter is operable for determining which of the grouped object RAID layout or individual RAID layout to convert the object into based on a size of the object being converted, wherein the grouped object RAID layout is selected based on determining whether a group comprises other objects similarly sized to the object, wherein the similarly sized objects comprise variably sized objects. The system further comprises a recomputed parity of the group to include the object, wherein the RAID layout comprises any of a RAID 5, a RAID 6, and a striped RAID layout. Also, the data converter is triggered when a predetermined number objects have been duplicated. Moreover, the data converter is triggered when the storage devices reach a limit on storage space. Furthermore, the data converter is triggered when the object remains dormant for a predetermined period of time. The grouped object RAID layout further comprises a group of similarly sized objects in the grouped object RAID layout, wherein the similarly sized objects comprise variably sized objects. The system further comprises means for removing the converted object from the grouped object RAID layout. Also, the redundancy data management controller is operable for duplicating the converted object.

These, and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
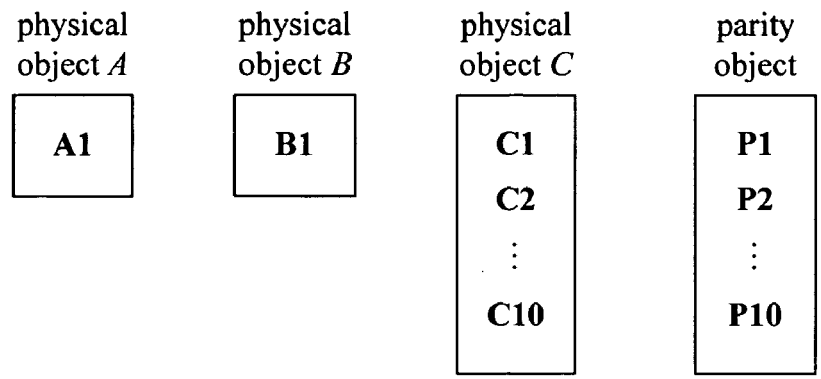
FIG. 1 is a schematic diagram representing a conventional data redundancy technique.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As previously mentioned, there is a need for a new data migration technique, which increases data storage space efficiency for variable-sized objects of data being stored redundantly. Referring now to the drawings, and more particularly to FIGS. 2 through 6, there are shown preferred embodiments of the invention. In order to ensure that storage efficiency is at it highest, the invention stores newly created virtual objects and virtual objects that are changing significantly in size using individually mirrored physical objects. Later, the invention converts these individually mirrored objects into a more space-efficient form by either adding them to a RAID 5 (or similar layout) group of objects, or converting the object to be individually laid out using a layout such as RAID 5 or RAID 6.

For a large virtual object, an individual parity RAID layout, such as RAID 5 or RAID 6, provides space-efficient storage. However, small virtual objects do not contain enough data to create an efficient striped layout. For example, using a RAID 5 layout with a stripe width of four data objects plus one parity object for a 500-byte virtual object will result in each data object containing only 125 bytes, and most storage systems actually reserve capacity in units of 4 to 64 kilobytes. This results in a large amount of wasted space for each physical object. Alternately, striping the data over fewer physical objects will reduce the amount of overhead in each physical object, but for small virtual objects the greatest efficiency comes when using one data object and one parity object, which is identical to mirroring and has at best 50% overhead. The grouped object RAID approach gives lower overhead for these small objects.

Again, when an object is first created, it is difficult to accurately estimate the size to which the object will eventually grow. For example, in ten randomly grouped objects, most objects would likely remain small. However, one might grow larger, which would result in an inefficient data storage system. The problem of determining how to group objects so they are approximately the same size can be made easier by delaying the decision. Often, objects will grow initially, and then remain at a stable or nearly stable length for a long time thereafter. However, while the object is in the initial growth phase, redundancy still has to be provided so that it can accommodate failure. Similarly, an existing object may, after some period of remaining stable, experience a period of changing size followed by another period when the length remains stable.

Figure 2:
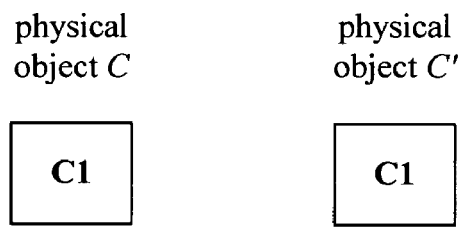
FIG. 2 is a schematic diagram representing a partially completed data redundancy technique according to an embodiment of the invention.

The solution provided by the invention is to store newly created objects using a mirrored (RAID 1) layout, independent of any other objects, and later to convert the objects to a more space-efficient layout. The object can either be added to a grouped layout of similarly sized objects, or converted to use an individual RAID 5 (or similar) layout. For example, a newly created one-block object is stored as two one-block physical objects C and C' that are mirrors of each other, as shown in FIG. 2. The two physical objects are stored on separate object storage devices.

Figure 3:
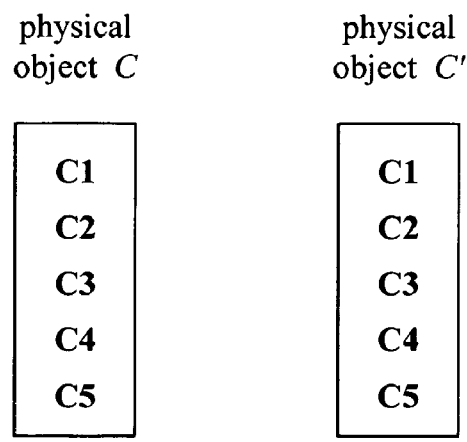
FIG. 3 is a schematic diagram representing a partially completed data redundancy technique according to an embodiment of the invention.
Figure 5:
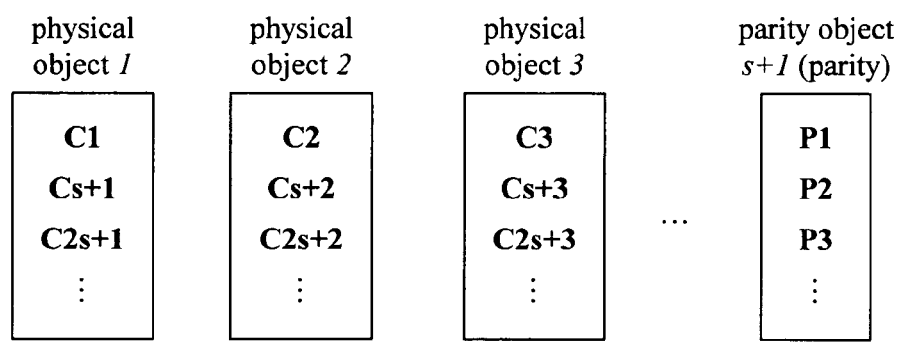
FIG. 5 is a schematic diagram representing a parity RAID layout data redundancy technique according to an alternative embodiment of the invention.

FIG. 3 shows that virtual object after it has grown to five blocks. Physical object C has grown to five blocks (C1 . . . C5). Correspondingly, physical object C' grows as well, and continues to store a copy of the data in physical object C. At this point, the invention determines whether the size of C is above a predetermined threshold value. If it is, the invention converts C from being individually mirrored to an individual parity RAID 5 layout of stripe width s by creating s+1 physical objects on separate object storage devices and copying data into the striped layout. Specifically, in the RAID 5 layout, block i of the jth physical object (numbered from 0 to s−1) receives the data from block [(s*j)+i] of the original object C. FIG. 5 illustrates the resulting layout. Once the new physical objects have been created, the data copied, and parity calculated for the RAID 5 layout, the mirrored physical objects may be discarded.

Figure 4:
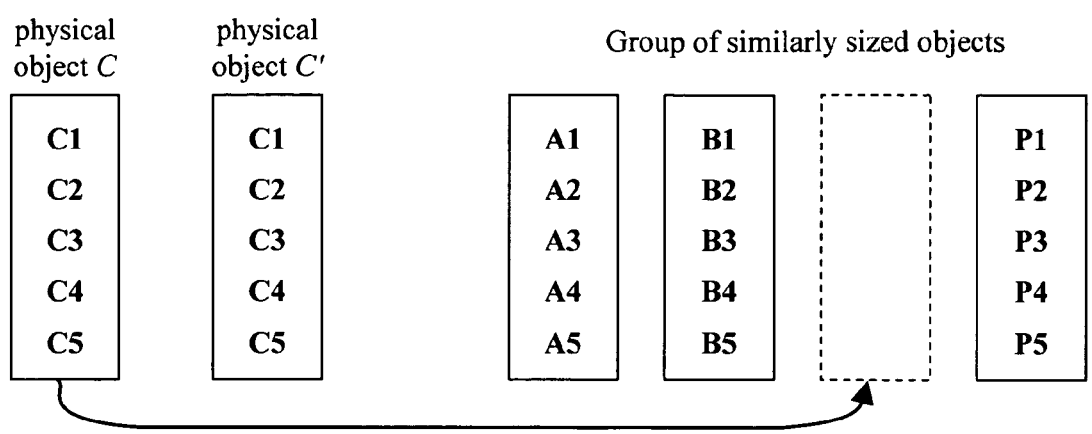
FIG. 4 is a schematic diagram representing a grouped object RAID data redundancy technique according to an embodiment of the invention.

If the size of C is not above that threshold, the invention converts C from being individually mirrored to being part of a grouped RAID 5 layout. Object C is grouped with other five-block objects A and B, as shown in FIG. 4. Once this occurs, with the values in the parity object P (P1 . . . P5) being recalculated to include C1 through C5, the mirror object C' is discarded, thus alleviating space in the storage system.

Figure 6:
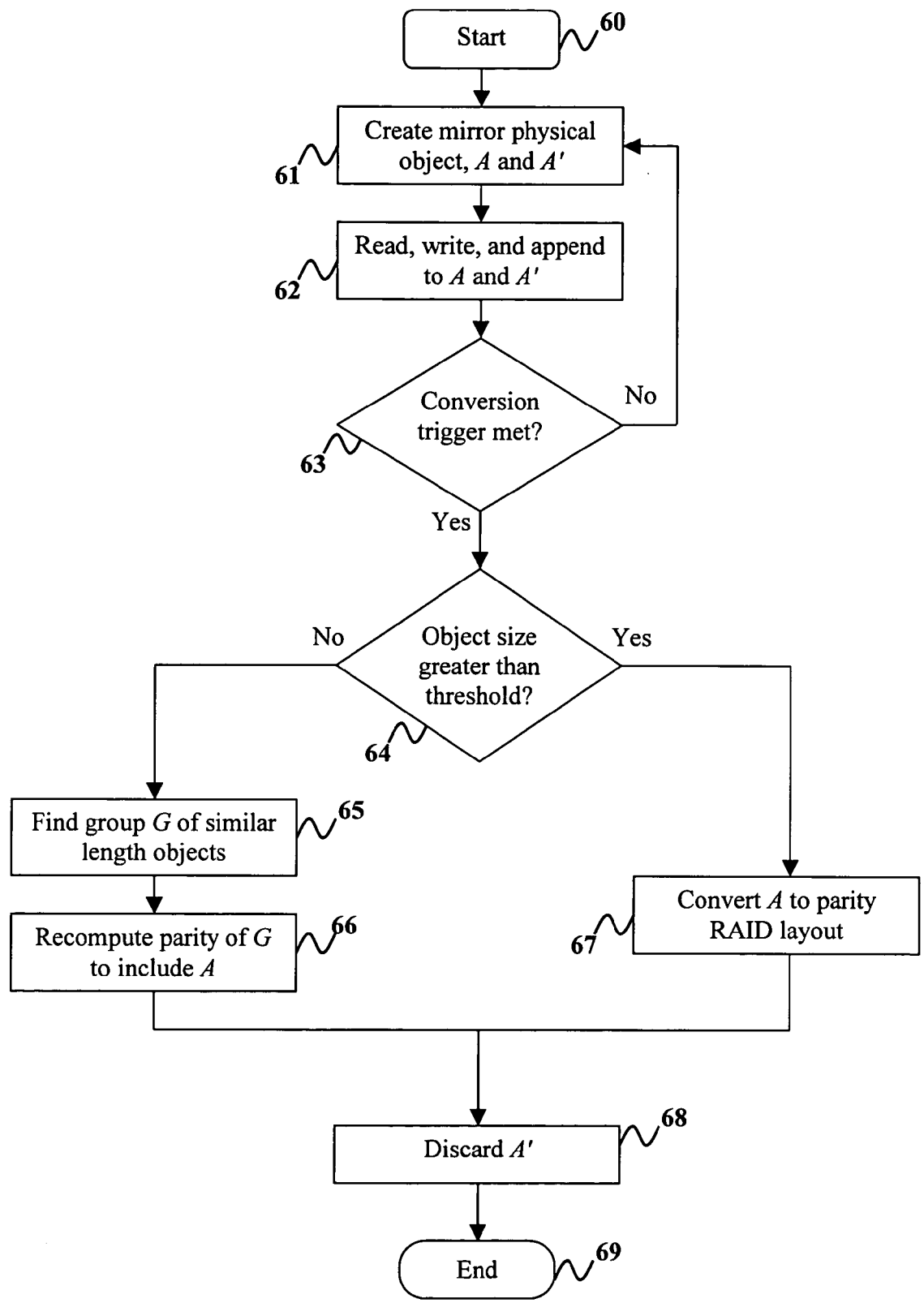
FIG. 6 is a flow diagram illustrating a preferred method of the invention, wherein a virtual object is converted to be stored as part of a grouped object RAID redundancy technique or using a parity RAID layout.

FIG. 6 is a flowchart describing the methodology for creating an individually mirrored object, then adding it to a RAID 5 group or converting it to an individual parity RAID 5 layout, for example. The process begins 60 by creating 61 a mirror physical object, for example object A and its mirror A'. Next, reads and writes to the virtual object are processed 62 by writing to both physical objects A and A' and reading from A, A', or both. Then, a decisional conversion trigger is reached 63, whereby if the trigger has not been met, then the process reverts back to the read, write step 62. If, however, the trigger has been met, then the process reaches a decision 64 on the size of the virtual object. If the condition is not met, then the invention finds 65 a group (for example, group G) of objects of length similar to object A.

Upon completion of this step, the invention recomputes 66 the parity of G to include object A. Specifically, byte i of the parity object in group G is updated to the value obtained by computing the XOR of the value in that byte before adding object A with the value of byte i in object A. Alternately, if the condition 64 on the size of the object is met, then the object is converted 67 to an individual parity layout. Specifically, one physical object is created on each of s+1 object storage devices, and the data in A is copied in such a way that it is striped over s of the physical objects. The parity of the stripes is computed and stored in the remaining physical object. Finally, after the object has been converted, the mirrored object A' is discarded 68, thereby ending 69 the process.

Furthermore, the invention provides a system for performing data redundancy comprising means for storing a variably sized object in a storage system, means for mirroring the object in the storage system, means for temporarily storing the mirrored object in the system, means for converting the object into any of a grouped object RAID layout and an individual parity RAID layout upon growth of the object; and means for discarding the mirrored object.

Figure 7:
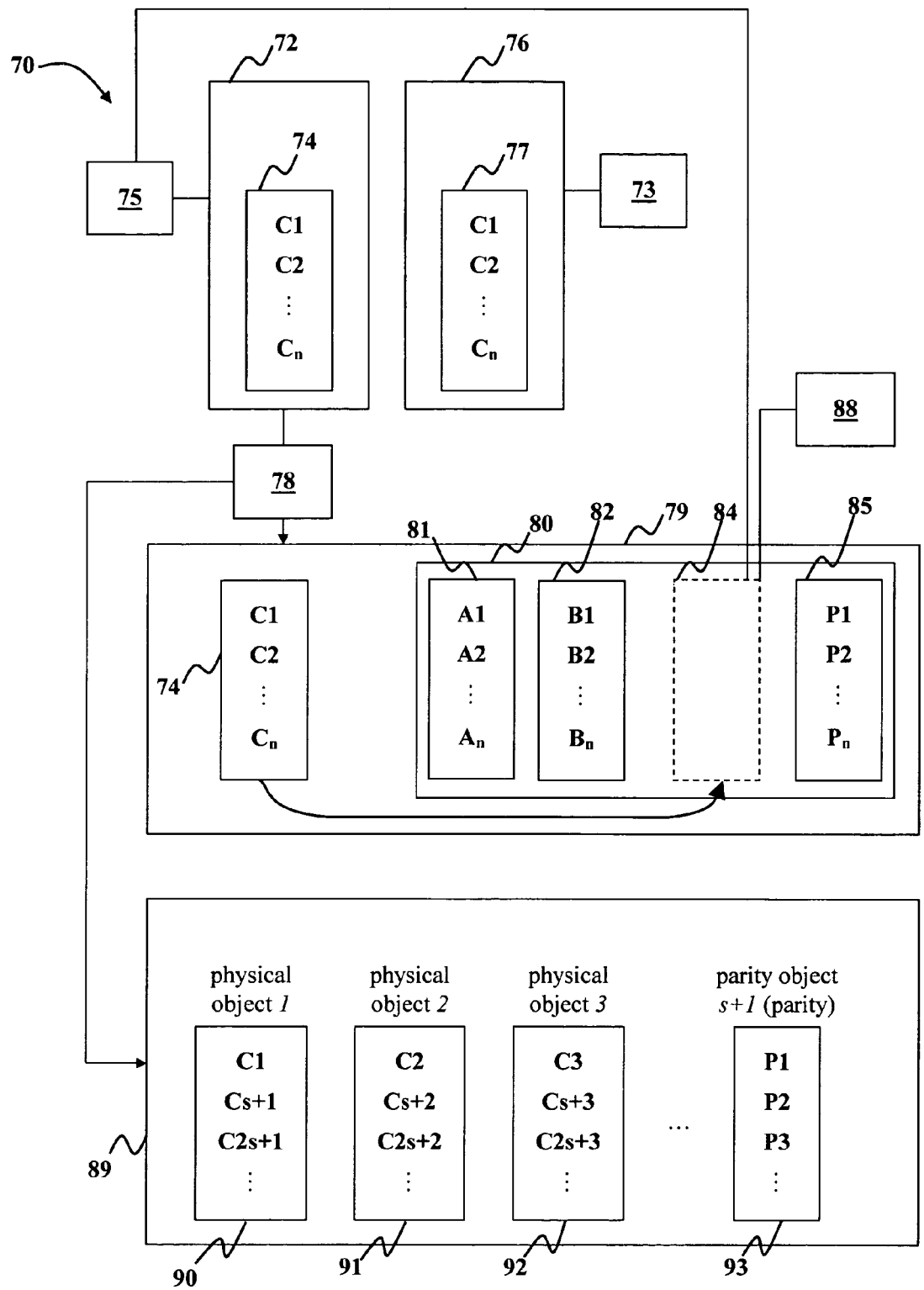
FIG. 7 is a system diagram illustrating an embodiment of the invention.

The system may incorporate computers, calculators, generators, storage units, converters, controllers, comparators, and other data generation, consolidation, and calculation devices arranged to perform the functions described above. Furthermore, those skilled in the art will readily understand implementing such an arrangement to perform the functions described above. For example, a computing system 70 as illustrated in FIG. 7 may be used, A system 70 for performing data redundancy comprises a set of object storage devices (only two object storage devices 72 and 76 are shown for ease of understanding), a variably sized object 74 in a first object storage device 72, a redundancy data management controller 75 operable for duplicating the object 74, a second object storage device 76 operable for temporarily storing the duplicated object 77; a data converter 78 operable for converting the object 74 into any of a grouped object Redundant Array of Independent Disks (RAID) layout 79 and an individual RAID layout 89 upon growth of the object 74 (as object 74 changes in size); and a data purger 73 operable for discarding the mirrored object 77.

According to the system 70 the data converter 78 is operable for determining which of the grouped object RAID layout 79 or individual RAID layout 89 to convert the object 74 into based on a size of the object 74 being converted, wherein the grouped object RAID layout 79 is selected based on determining whether a group comprises other objects 81, 82 similarly sized to the object 74, wherein the similarly sized objects 81, 82 comprise variably sized objects. The system 70 further comprises a recomputed parity 85 of the group 80 to include the object 74, wherein the RAID layout 79 comprises any of a RAID 5, a RAID 6, and a striped RAID layout. The data converter 78 is also operable to convert the object 74 into an individual RAID layout 89, wherein the individual RAID layout 89 comprises other objects 90, 91, 92, and 93, wherein the data in object 74 is striped across the objects 90, 91, and 92, and wherein the object 93 comprises the parity of objects 90, 91, and 92.

The individual RAID layout 89 further comprises variably sized objects. The individual RAID layout 89 further comprises any of a RAID 5, a RAID 6, and a striped RAID layout.

Also, the data converter 78 is triggered when a predetermined number (system-dependent) objects 74 have been duplicated, or alternatively, the data converter 78 is triggered when the storage devices 72 reach a limit on storage space. Furthermore, the data converter 78 may be triggered when the object remains 74 dormant for a predetermined period of time (system-dependent). The grouped object RAID layout 79 further comprises a group of similarly sized objects 81, 82 in the grouped object RAID layout, wherein the similarly sized objects comprise variably sized objects. The system further comprises a second purger 88 for removing the converted object 84 from the grouped object RAID layout 79. Also, the redundancy data management controller 75 is operable for duplicating the converted object 84.

There are several benefits of the invention including a reduction in the cost of storage systems by storing data in the most efficient redundant form. Moreover, the invention provides the flexibility of adapting as objects change in size. In order to ensure that storage efficiency is at it highest, the invention stores newly created virtual objects and virtual objects that are changing significantly in size using individually mirrored physical objects. Thereafter, the invention converts these individually mirrored objects into a more space-efficient form by either adding them to a RAID 5 (or similar layout) group of objects, or converting the object to be individually laid out using a layout such as RAID 5 or RAID 6.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A method of performing data redundancy, said method comprising:

storing a variably sized object capable of changing a number of bytes of data included therein in a first object storage device, wherein said variably sized object experiences a period of changing size followed by a period of having a stable size;

temporarily storing a duplicate of said variably sized object in a second object storage device separate from said first object storage device;

converting said variably sized object into any of a grouped object Redundant Affay of Independent Disks (RAID) layout and an individual RAID layout as said variably sized object changes in size, which occurs only after a size of said variably sized object has previously remained dormant for a predetermined period of time; wherein said step of converting further comprises determining which of said grouped object RAID layout or individual RAID layout to convert said variably sized object into based on a size of the variably sized object being converted; wherein said step of converting into a grouped object RAID layout further comprises selecting a group based on whether said group comprises other objects similarly sized to said variably sized object; wherein the similarly sized objects comprise variably sized objects capable of changing a number of bytes of data included therein; recomputing a parity of said group to include said variably sized object; and discarding the duplicate variably size object.

2. The method of claim 1, wherein said RAID layout comprises any of a RAID 5, a RAID 6, and a striped RAID layout.

3. The method of claim 1, wherein said step of converting occurs when a predetermined number of variably sized objects have been duplicated.

4. The method of claim 1, wherein said step of converting occurs when said storage devices reach a limit on storage space.

5. The method of claim 1, wherein said step of converting only occurs when a size of said variably sized object remains dormant for a predetermined period of time.

6. The method of claim 1, wherein said step of converting to a grouped object RAID layout further comprises forming a group of similarly sized objects in said grouped object RAID layout.

7. The method of claim 6, wherein said similarly sized objects comprise variably sized objects.

8. The method of claim 1, further comprising removing the converted variably sized object from said grouped object RAID layout.

9. The method of claim 1, further comprising duplicating said converted variably sized object.

10. A method of performing data redundancy, said method comprising:

storing a variably sized object capable of changing sizes in a first object storage system, wherein said variably sized object is independent of any other object, and wherein a size of said variably sized object initially remains stable followed by a period of changing sizes followed by a period of being stable;

mirroring said variably sized object;

temporarily storing the mirrored variably sized object in a second object storage system separate from said first object storage system;

converting said variably sized object into any of a grouped object Redundant Affay of Independent Disks (RAID) layout and an individual RAID layout upon growth of said variably sized object, which occurs only after a size of said variably sized object has previously remained dormant for a predetermined period of time; wherein said step of converting further comprises determining which of said grouped object RAID layout or individual RAID layout to convert said variably sized object into based on a size of the variably sized object being converted; wherein said step of converting into a grouped object RAID layout further comprises selecting a group based on whether said group comprises other objects similarly sized to said variable sized object; wherein the similarly sized objects comprise variably sized objects capable of changing sizes; recomputing a parity of said group to include said variably sized object; and discarding the mirrored variably sized object.

11. The method of claim 10, wherein said RAID layout comprises any of a RAID 5, a RAID 6, and a striped RAID layout.

12. The method of claim 10, wherein said step of converting only occurs when a predetermined number of variably sized objects have been mirrored.

13. The method of claim 10, wherein said step of converting occurs when said storage devices reach a limit on storage space.

14. The method of claim 10, wherein said step of converting occurs when a size of said variably sized object remains dormant for a predetermined period of time.

15. The method of claim 10, wherein said step of converting to a grouped object RAID layout further comprises forming a group of similarly sized objects in said grouped object RAID layout.

16. The method of claim 15, wherein said similarly sized objects comprise variably sized objects capable of changing a number of bytes of data included therein.

17. The method of claim 10, further comprising removing the converted variably sized object from said grouped object RAID layout.

18. The method of claim 10, further comprising duplicating said converted variably sized object.

19. A system for performing data redundancy comprising:
a set of object storage devices;
a variably sized object capable of changing sizes by changing a number of bytes of data included therein in a first object storage device, wherein said variably sized object experiences a period of changing size followed by a period of having a stable size;
a redundancy data management controller operable for duplicating said variably sized object;
a second object storage device separate from said first object storage device and operable for temporarily storing the duplicated variably sized object;
a data converter operable for converting said variably sized object into any of a grouped object Redundant Array of Independent Disks (RAID) layout and an individual RAID layout when said object changes in size, which occurs only after a size of said variably sized object has remained dormant for a predetermined period of time; wherein said data converter is operable for determining which of said grouped object RAID layout or individual RAID layout to convert said variably sized object into based on a size of the variably sized object being converted; wherein said grouped object RAID layout is selected based on determining whether a group comprises other objects similarly sized to said variably sized object; wherein the similarly sized objects comprise variably sized objects capable of changing sizes by changing a number of bytes of data included therein; further comprising a recomputed parity of said group to include said variably sized object; and
a data purger operable for discarding the duplicated variably sized object.

20. The system of claim 19, wherein said RAID layout comprises any of a RAID 5, a RAID 6, and a striped RAID layout.

21. The system of claim 19, wherein said data converter is triggered when a predetermined number of variably sized objects have been duplicated.

22. The system of claim 19, wherein said data converter is triggered when said storage devices reach a limit on storage space.

23. The system of claim 19, wherein said data converter is triggered only when a size of said variably sized remains dormant for a predetermined period of time.

24. The system of claim 19, wherein said grouped object RAID layout further comprises a group of similarly sized objects in said grouped object RAID layout.

25. The system of claim 24, wherein said similarly sized objects comprise variably sized objects capable of changing a number of bytes of data included therein.

26. The system of claim 19, further comprising means for removing the converted variably sized object from said grouped object RAID layout.

27. The system of claim 19, wherein said redundancy data management controller is operable for duplicating said converted variably sized object.

28. A system for performing data redundancy comprising:
means for storing a variably sized object capable of changing a number of bytes of data included therein in a first object storage system, wherein said variably sized object is independent of any other object, and wherein a size of said variably sized object initially remains stable followed by a period of changing sizes followed by a period of being stable;
means for mirroring said variably sized object;
means for temporarily storing the mirrored variably sized object in a second object storage system separate from said first object storage system;
means for convening said variably sized object into any of a grouped object Redundant Affay of Independent Disks (RAID) layout and an individual RAID layout upon growth of said variably sized object, which occurs only after a size of said variably sized object has remained dormant for a predetermined period of time; means for determining which of said grouped object RAID layout or individual RAID layout to convert said variably sized object into based on a size of the variably sized object being converted; means for selecting a group based on whether said group comprises other objects similarly sized to said variable sized object; wherein the similarly sized objects comprise variably sized objects capable of changing sizes; means for recomputing a parity of said group to include said variably sized object; and
means for discarding the mirrored variably sized object.

* * * * *